US010800312B2

(12) United States Patent
Havas et al.

(10) Patent No.: US 10,800,312 B2
(45) Date of Patent: Oct. 13, 2020

(54) LOAD HANDLING DEVICE FOR A TRANSPORTATION UNIT AND A TRANSPORTATION UNIT WITH SAID DEVICE

(71) Applicant: Lifthanger Finland Oy, Oulu (FI)

(72) Inventors: Pertti Tapio Havas, Oulu (FI); Jari Antero Karvola, Oulu (FI); Pekka Eljas Ylermi Kolivuori, Oulu (FI)

(73) Assignee: LIFTHANGER FINLAND OY, Oulu (FI)

( * ) Notice: Subject to any disclaimer, the term of this patent is extended or adjusted under 35 U.S.C. 154(b) by 121 days.

(21) Appl. No.: 16/307,495

(22) PCT Filed: Jun. 7, 2017

(86) PCT No.: PCT/FI2017/050420
§ 371 (c)(1),
(2) Date: Dec. 6, 2018

(87) PCT Pub. No.: WO2017/212115
PCT Pub. Date: Dec. 14, 2017

(65) Prior Publication Data
US 2019/0299834 A1    Oct. 3, 2019

(30) Foreign Application Priority Data

Jun. 10, 2016  (FI) ..................................... 20165479
Mar. 9, 2017   (FI) ................................. 20174065 U

(51) Int. Cl.
*B60P 1/54*     (2006.01)
*B66C 11/10*    (2006.01)
*B66C 23/42*    (2006.01)

(52) U.S. Cl.
CPC ........... *B60P 1/5419* (2013.01); *B60P 1/5495* (2013.01); *B66C 11/10* (2013.01); *B66C 23/42* (2013.01)

(58) Field of Classification Search
CPC .............................. B60P 1/5419; B60P 1/5495
(Continued)

(56) References Cited

U.S. PATENT DOCUMENTS

| 4,639,182 | A | * | 1/1987 | Inaba | B60P 1/5447 212/231 |
| 4,690,609 | A | * | 9/1987 | Brown | B60P 3/055 296/186.4 |
| 2008/0277365 | A1 | * | 11/2008 | Sager | B60P 1/5466 212/285 |

FOREIGN PATENT DOCUMENTS

DE    3526039 A1 *  1/1987
EP    0983899 A2 *  3/2000
(Continued)

OTHER PUBLICATIONS

DE 3526039 A1 Machine Translation.
(Continued)

*Primary Examiner* — Gerald McClain
(74) *Attorney, Agent, or Firm* — Jacob Eisenberg

(57) ABSTRACT

The device comprises a folding handling arm, equipped with a handling head and at least two successive arm parts, in which the arm parts are connected to each other by a folding fastening, the device further comprising a suspension structure (HS) to suspend the handling arm for the purpose of supporting it, the device further comprising a rotating structure to turn the handling arm by turning the suspension structure in relation to the support frame located at the upper part of the cargo space in the device. The suspension structure of the handling arm is essentially a rotationally symmetrical, rotation ring structure disc that is rotatable in
(Continued)

relation to its support frame with the rotating structure in order to suspend the handling arm for the purpose of supporting it.

19 Claims, 11 Drawing Sheets

(58) Field of Classification Search
USPC .......................... 187/222, 224–230, 237, 238
See application file for complete search history.

(56) References Cited

FOREIGN PATENT DOCUMENTS

FR           2588843 A1 * 4/1987
GB          2375095 A  * 11/2002

OTHER PUBLICATIONS

FR 2588843A1 Machine translation.
EP 0983899 A2 Machine translation.
WO2017212115-ISR-20171214-3465.
WO2017212115-WOSA-20171214-3467.
WO2017212115-IPRP1-20181211-2589.
FI2017050420-IASR.

* cited by examiner

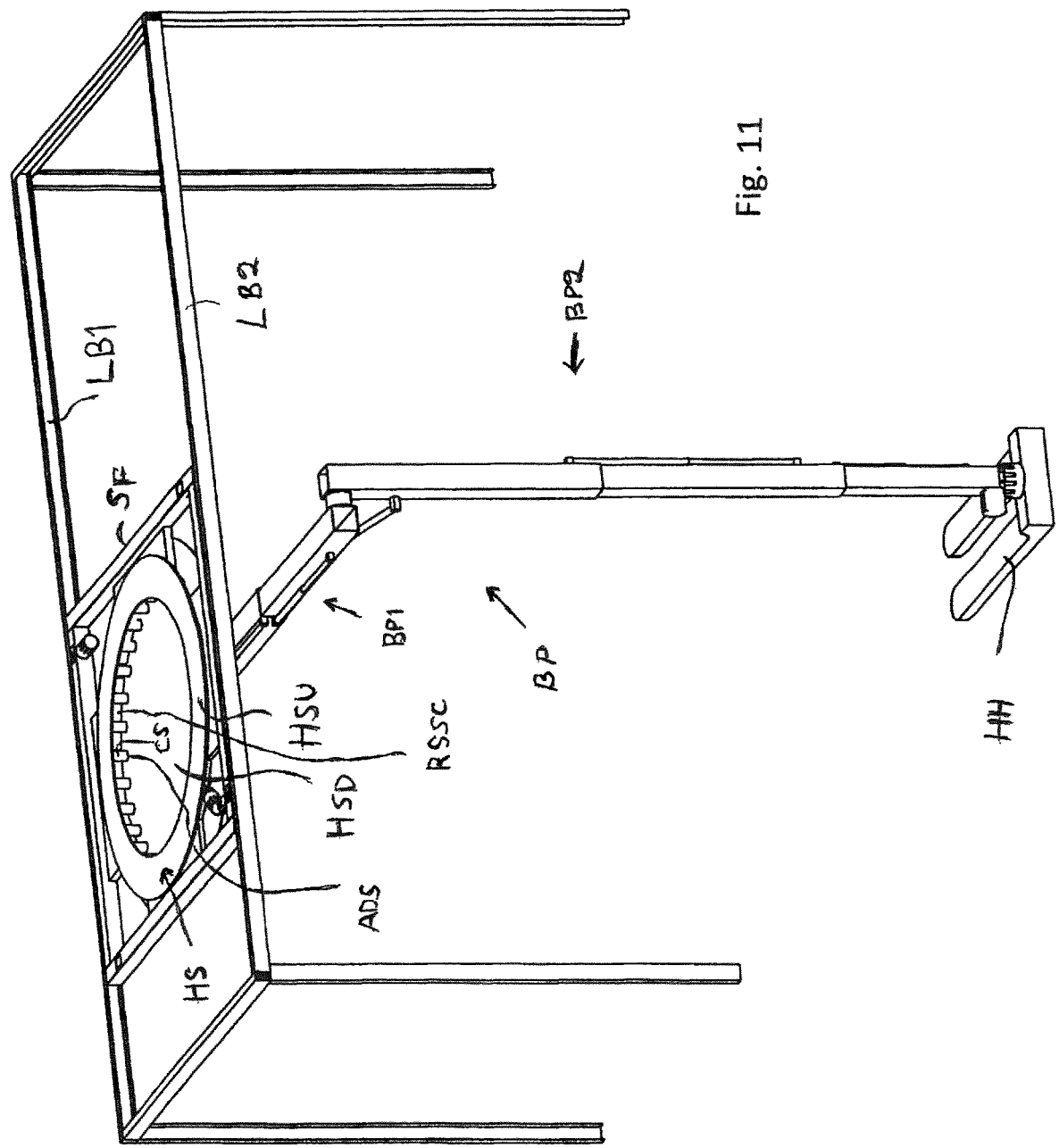

LOAD HANDLING DEVICE FOR A TRANSPORTATION UNIT AND A TRANSPORTATION UNIT WITH SAID DEVICE

BACKGROUND OF THE INVENTION

The invention relates to transportation units used in connection with transportation vehicles. A transportation vehicle may be, for example, a lorry, an articulated vehicle, a van or another vehicle, and a transport unit may be one that is fixed to the vehicle, or it may be, for example. in the form of a trailer, that is, a detachable transportation unit in relation to the vehicle.

Vehicles transporting goods transport goods from their point of origin either to distribution terminals/intermediate storages or directly to a destination, such as a retail dealer or directly to the end user of the goods. An example of goods transported may be a crate or a barrel. In a transportation unit, goods may be on a so-called forklift pallet, or the goods may be provided with gripping means in other ways, or the goods may have a shape that allows them to be handled.

A conventional way to load and unload goods is to use a forklift, which by means of its forklift forks lifts goods by lifting the forklift pallet under the goods, which has pockets for the forks of the forklift. If the goods are not on a forklift pallet and if the goods are round, for example, such as a roll, such as a paper roll, the forklift may instead of the forks have a two-sided gripper.

However, the use of forklifts or other external, separate transfer and handling devices is not possible, if a loading site or unloading site has no forklift available. To obviate the problem in question it is also known that a forklift may travel on the vehicle for the duration of the transfer transportation, at the back part of the transportation unit, for example, but this is associated with problems as regards, for example, the fact that a forklift reduces the amount of transportable effective load, which diminishes the effectiveness of transportation operations.

From publications U.S. Pat. No. 4,690,609 and US2008/277365, goods handling devices integrated into a transportation unit of a vehicle are known. Said publication U.S. Pat. No. 4,690,609 has a structure implemented with telescopic or otherwise successive linearly-moving arm parts in a 90-degree angle in relation to each other, which is suspended between two longitudinal tracks and being movable, in the direction of the tracks, with a chain drive back and forth in the direction of the cargo space of the vehicle. Said other publication US2008/277365 has a telescopic boom directly supported to a fixed round rim, in relation to which the telescopic boom may be turned, that is, the boom is supported by small connecting pieces, only, supported by which the boom is turnable in relation to a circular, fixed slide rail. Other known devices are discloses in publications DE3526039, U.S. Pat. No. 3,061,111 and DE4216709.

The closest prior art solutions involve problems as relates to how much space the suspension of the handling arm takes and how stable it is, and there are additional problems as relates to how major the modifications required by the installation of the device are to the rest of the structure of the transportation unit. Cold operating conditions present their own challenges.

SUMMARY OF THE INVENTION

An object of the invention is thus to develop a device for load handling and a transportation unit provided with the device to so as to enable the aforementioned problems to be solved. The object of the invention is achieved by a device and transportation unit which are characterised by what is disclosed in the independent claims. Preferred embodiments of the invention are disclosed in the dependent claims.

The invention is based on the use of a disc-like suspension structure.

The advantages of the invention include good stability of the suspension, diverse use of the handling device, and effective use of space.

LIST OF FIGURES

The invention will now be described in more detail in connection with preferred embodiments and with reference to the accompanying drawings, in which.

Figure 3:
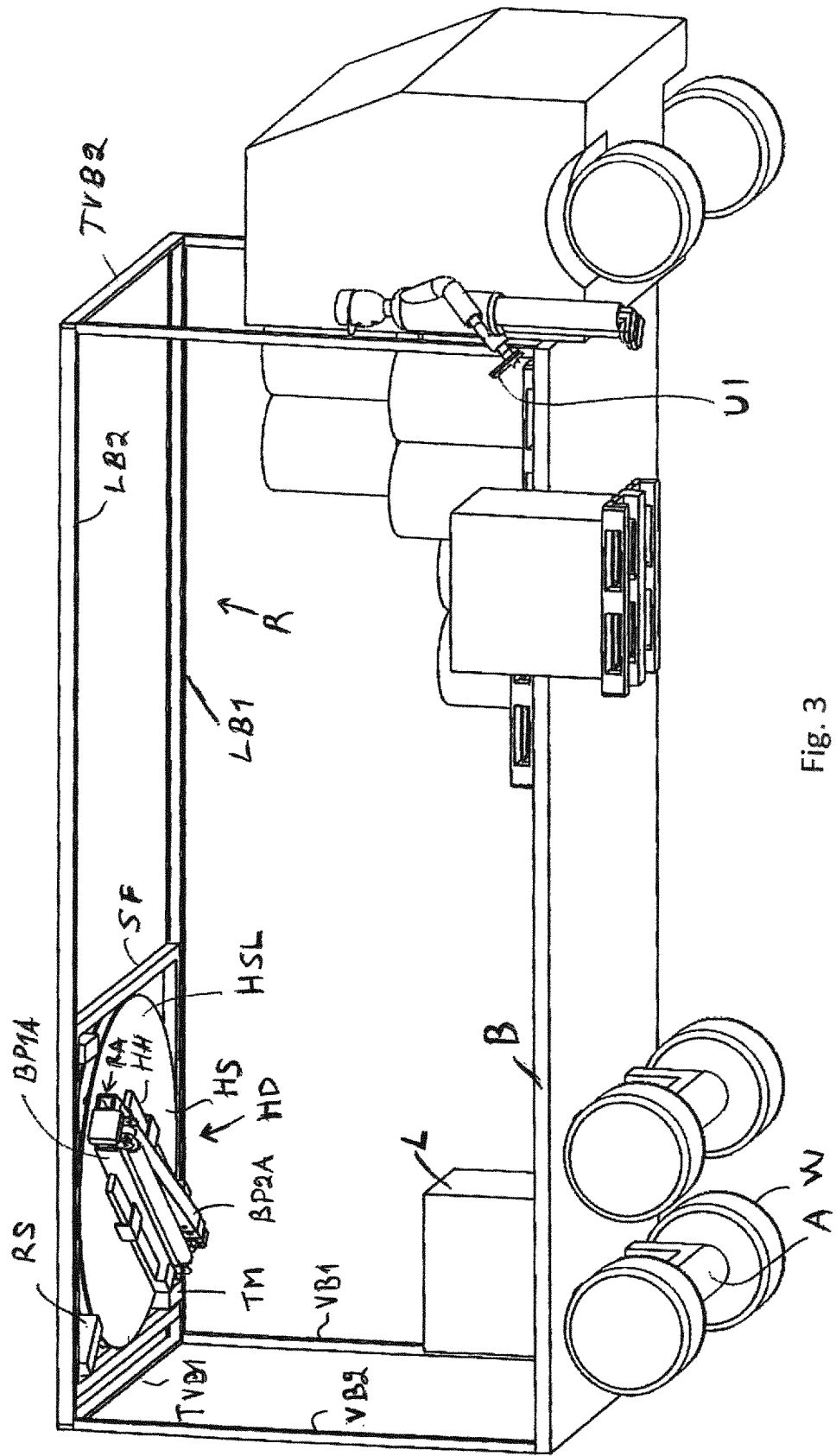
Figure 4:
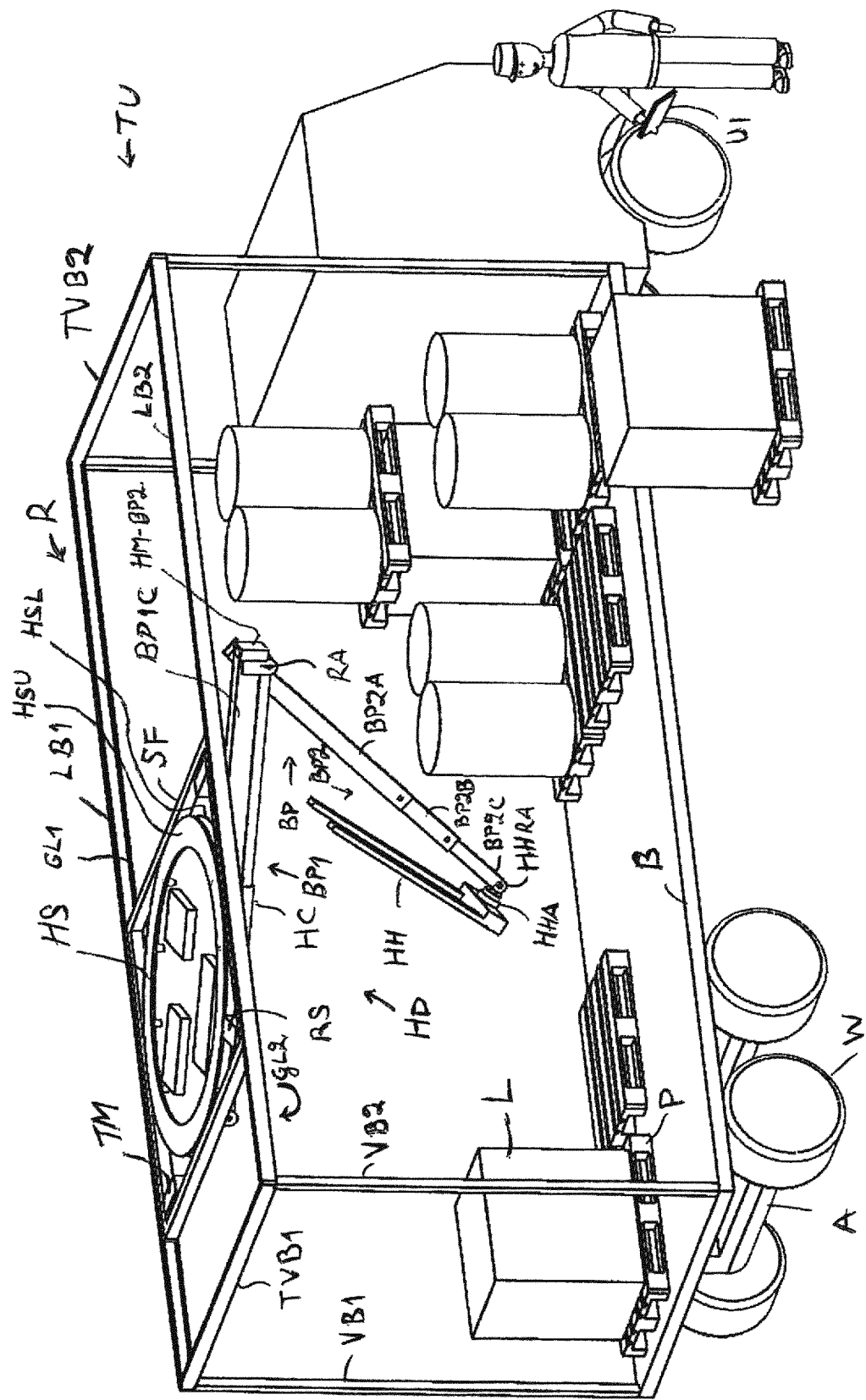
Figure 5:
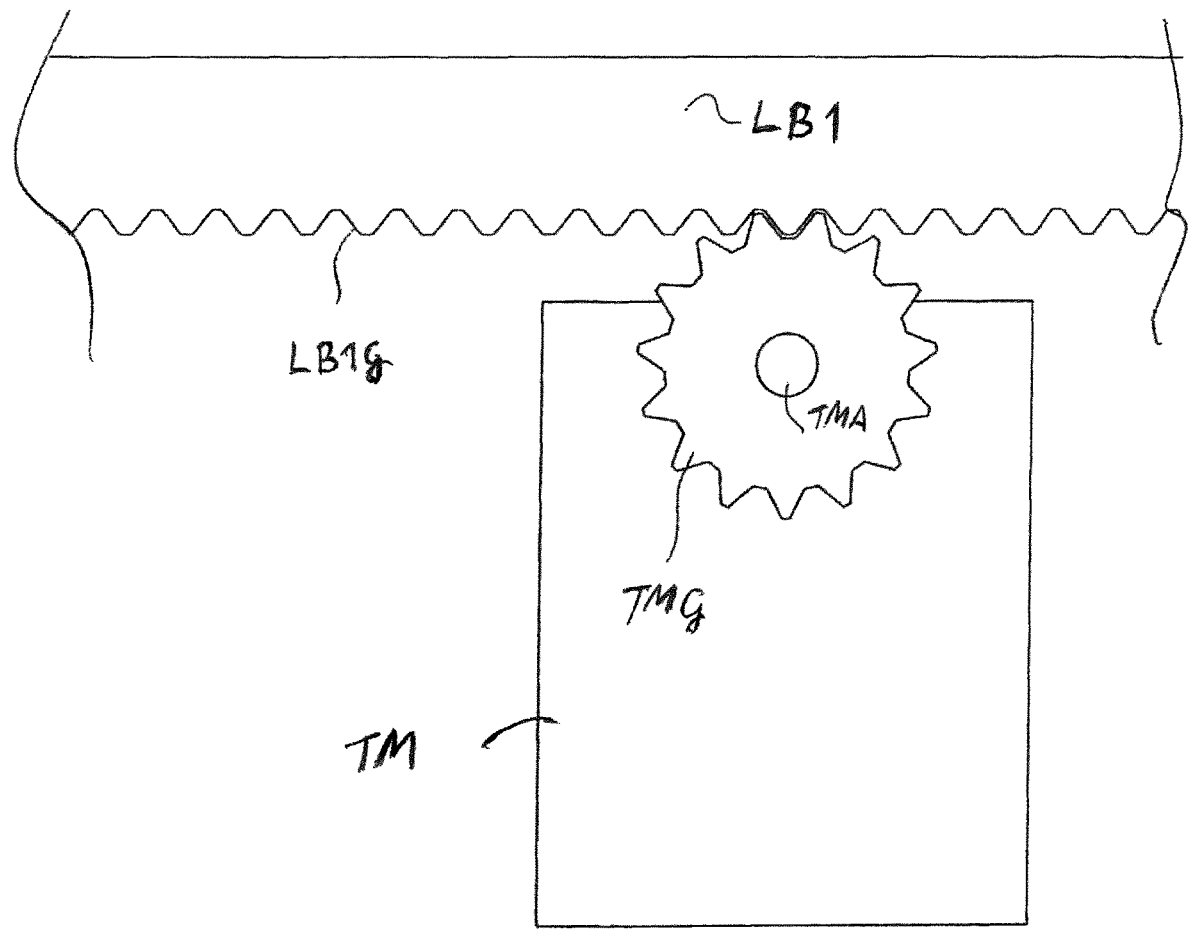
Figure 6:
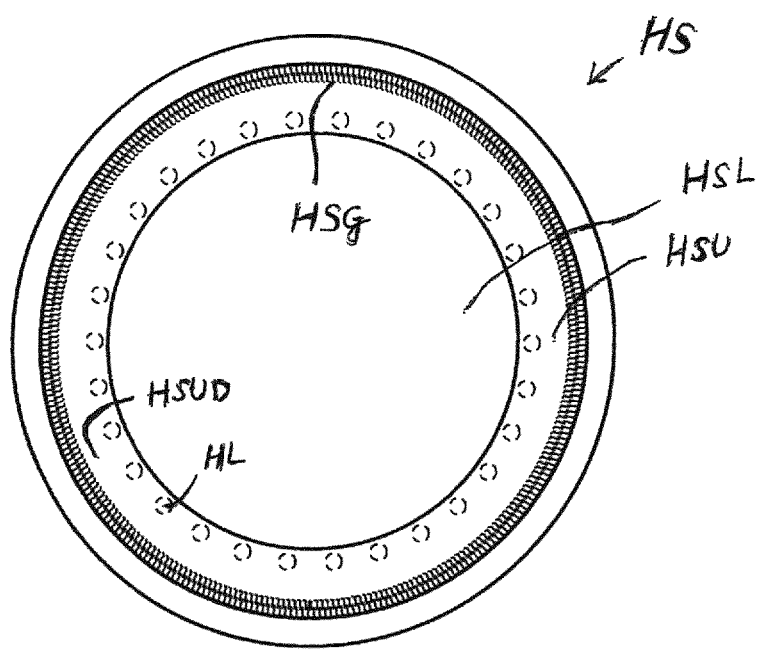
Figure 7:
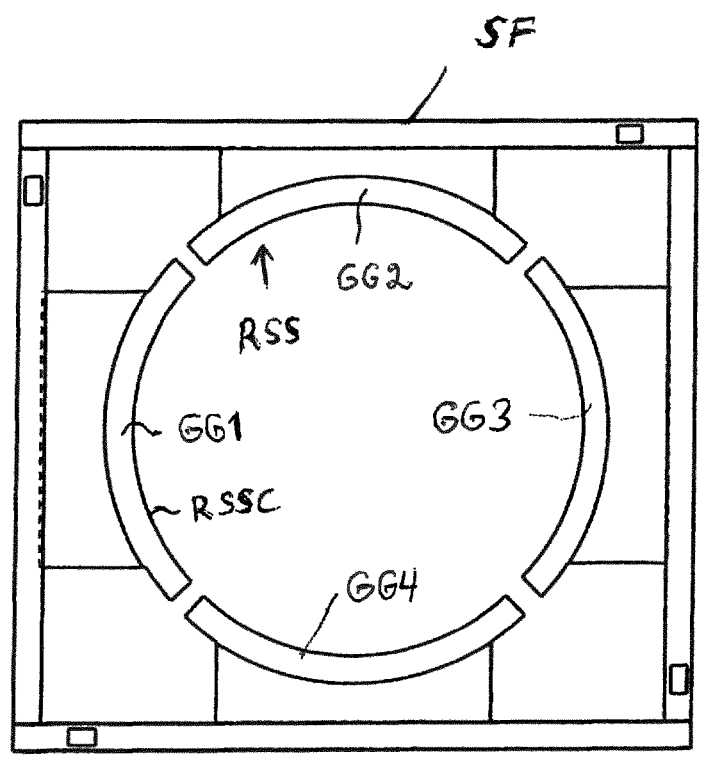
Figure 8:
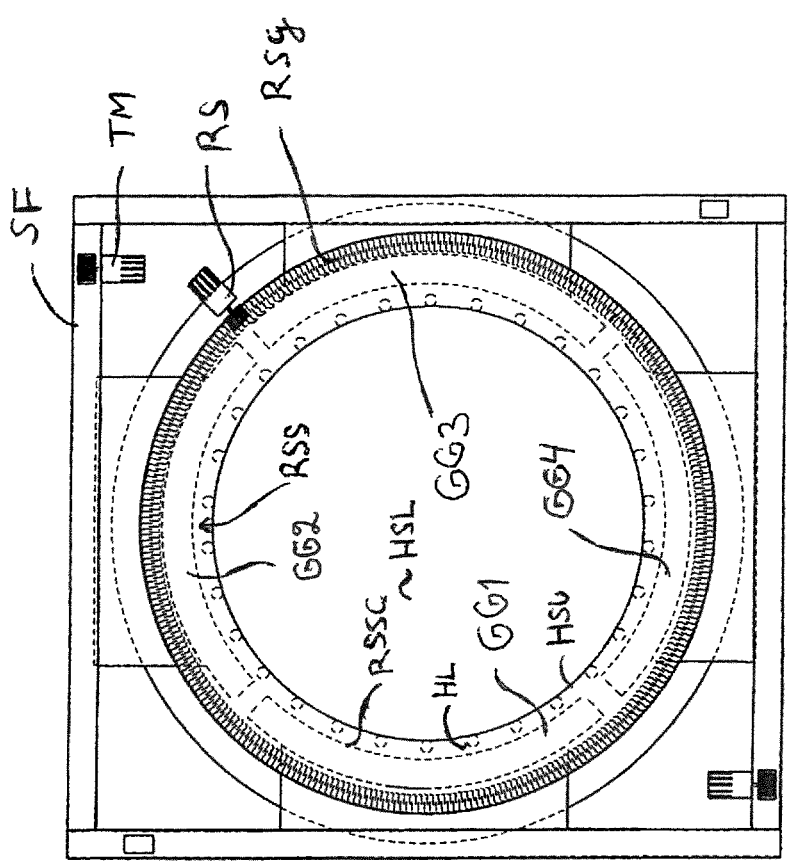
Figure 9:
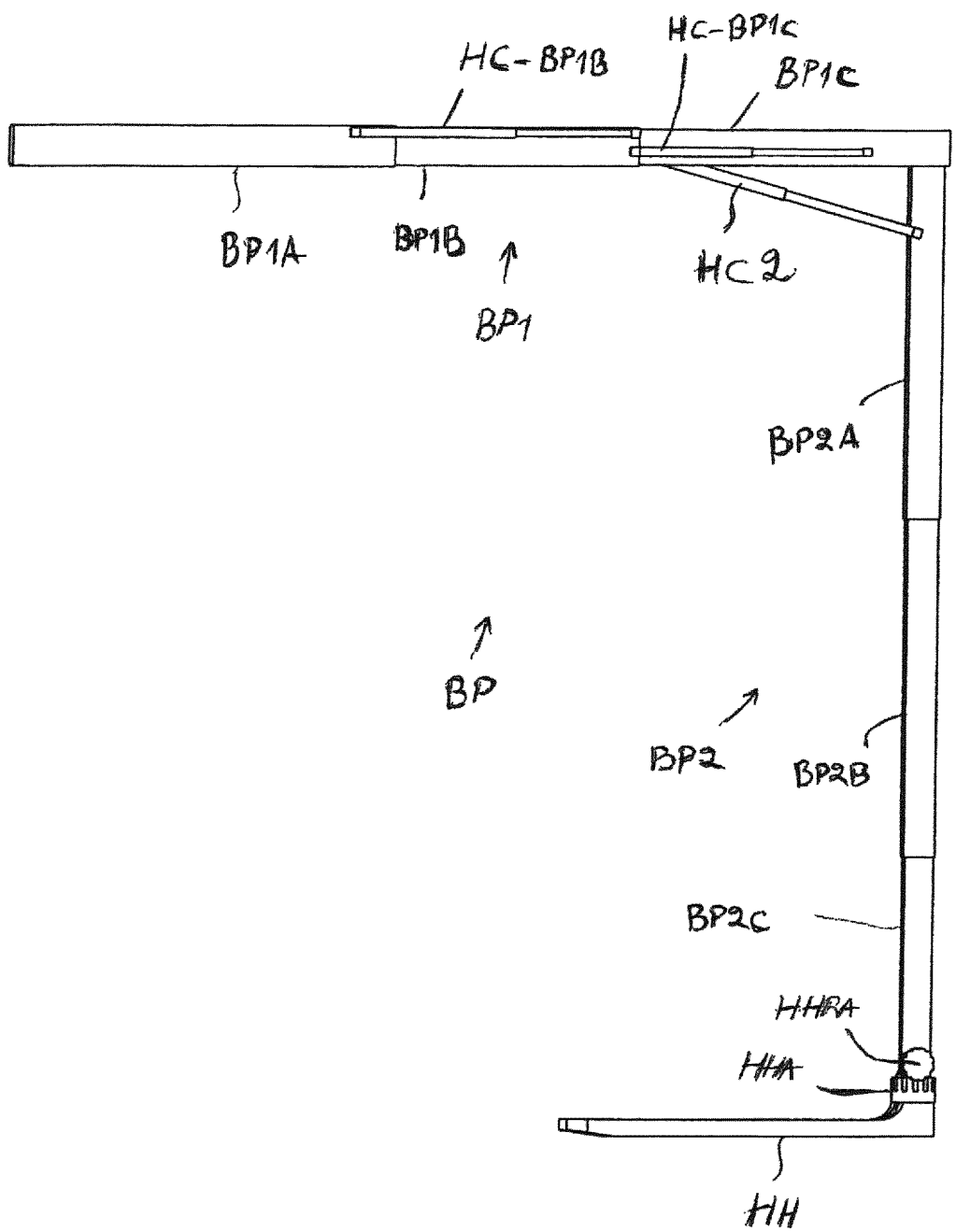
Figure 10:
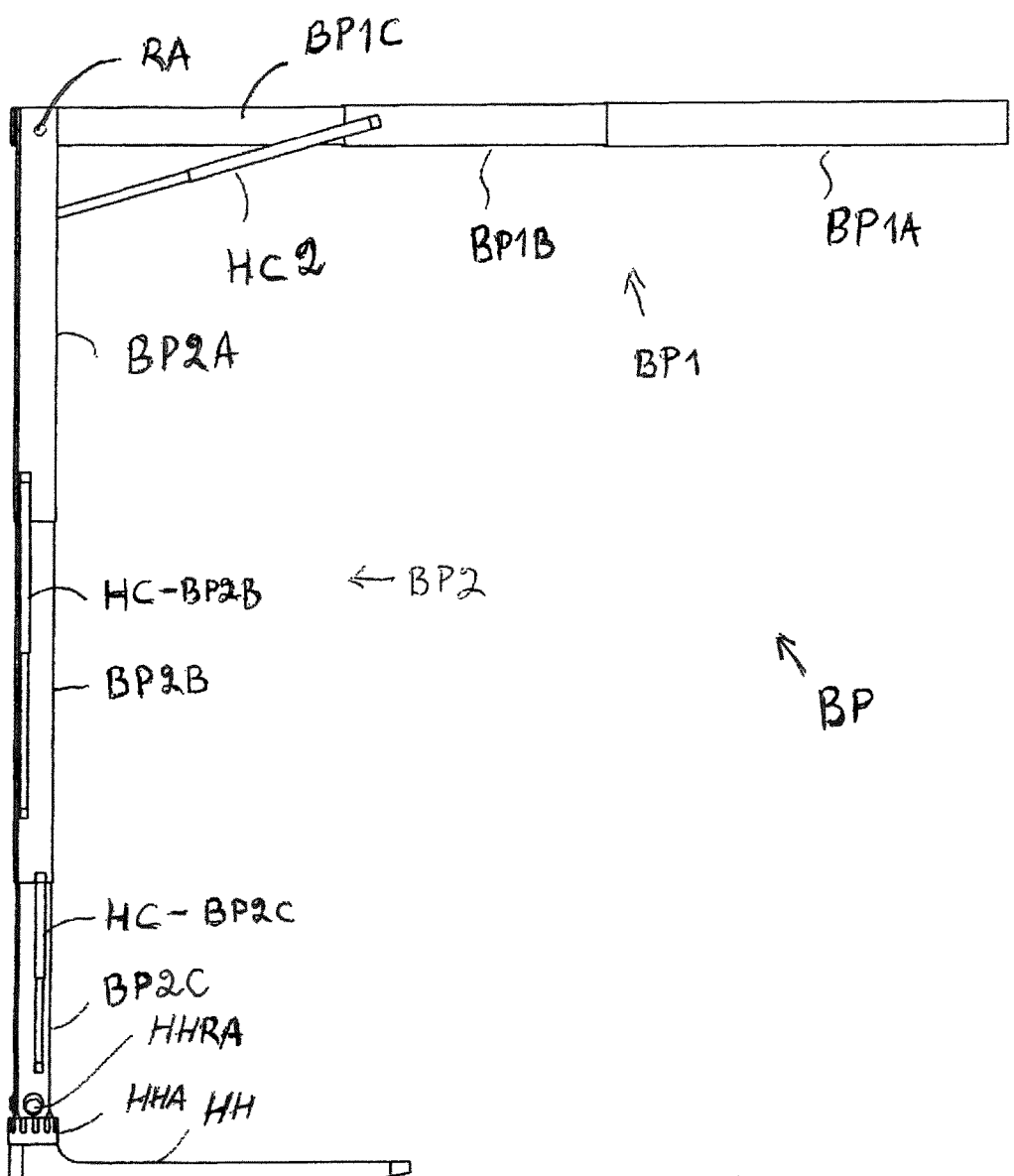

FIG. 3 shows a load handling device in its retracted position at the roof of the transportation unit, FIG. 4 shows the handling device in an intermediate position, FIG. 5 shows the coupling of a gear of a motor that moves the handling device in the longitudinal direction or the transportation unit to the mating gears on an edge beam in the longitudinal direction of the roof, FIG. 6 shows the rotation ring structure, FIG. 7 shows a support frame at its top surface, FIG. 8 shows the movable support frame of FIG. 7, supported by which the rotatable suspension structure/rotation ring structure and motors of FIG. 6 are, FIGS. 9 to 10 show the arm structure on its opposite sides, FIG. 11 is a perspective view of the device.

DETAILED DESCRIPTION OF THE INVENTION

With reference to the figures, a transport unit TU comprised by a vehicle or connected to a vehicle as a trailer is the target of application. The transport unit TU comprises axles A and, on the axles, wheels W supported by which the transport unit 100 is ground-supported. The transport unit TU has a bottom B and upright beams VB1, VB2, that is, vertical beams VF, and supported on them, beams in the longitudinal direction of the roof R, that is, beams LB1, LB2 at the edges of the roof of the transportation unit. In addition, the transport unit TU comprises transverse frame beams TVB1, TVB2 that interconnect the beams at the different sides of the transport unit. The beams may be solid or, for example, profile pipes with a wall thickness of 3 to 5 mm, for example, and with a width of 7 to 15 cm, for example. The beams LB1, LB2 at the roof edge are H beams, for example, because their shape best allows the support of the support frame SF of the handling device HD and its longitudinal movement in relation to the beams LB1, LB2 of the roof.

The Figures, FIGS. 1 to 4 in particular, show a device HD for load handling, integrated into the roof R of the transportation unit TU. Load handling refers to the loading and/or unloading of a load L, and it is associated with gripping an item forming the load on its part, the required transfer movement, and after the transfer movement, releasing the item L. It is obvious that prior to gripping an item and after releasing an item there may also be movement of the handling arm so that the handling arm BP is either brought out or taken back to a concealed position, as shown in FIG. 4.

The load handled by the handling device HD is denoted by the marking L and the support beneath it, such as a forklift pallet, is denoted by the marking P.

FIG. 3 shows the handling device HD in its retracted position at the roof R of the transportation unit TU. As low a structure as 300 mm may be reached as regards how little space the handling device in its retracted form requires at the roof R of the transportation unit TU. FIG. 4 shows a situation either before the position of FIG. 3 or one after the position of FIG. 3.

The handling device HD comprises a folding handling arm BP, equipped with a handling head HH and at least two successive arm parts BP1, BP2, in which the arm parts BP1, BP2 are connected to each other by a rotating fastening RA, that is, a fastening RA that allows turning, that is, folding.

The rotating fastening RA is a pin and hole support, bearing, pivoting or a similar structure, making it possible to tilt, that is, fold the arm parts BP1, BP2 of the handling arm BP in relation to each other, so in practice the latter arm part BP2 may be folded, that is, tilted in the plane of the handling arm BP in relation to the preceding arm part BP1. Folding, that is, tilting may be performed with an actuator HM-BP2, which is a hydraulic or electromechanical motor, for example, the purpose of which is the same as that of the actuator HC2 of FIGS. 9 to 10.

Figure 2:
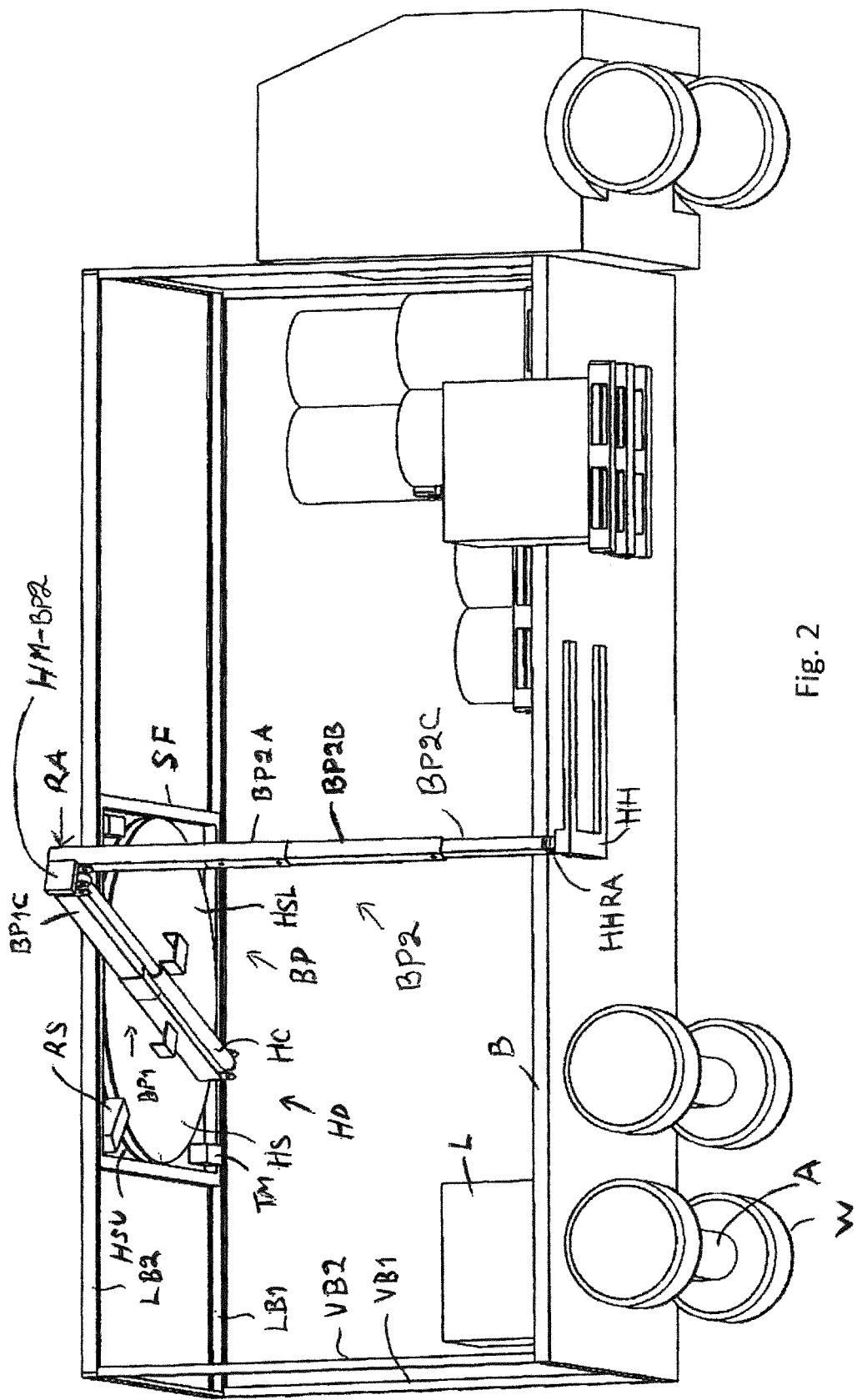
FIG. 2 shows the transportation unit obliquely from below.

The actuator shown in FIGS. 2 to 4, such as a hydraulic cylinder HC provided with a piston is arranged to carry out the longitudinal adjustment of the first part of the handling arm, that is, the horizontal part BP1, so the task of the cylinder HC is the same as that of cylinders HC-BP1, HCBP1C in FIG. 9. Other actuators of the longitudinal adjustment of the arm BP are not shown in FIGS. 2 to 4, they may be invisible inside the arm or, as in FIG. 10, external, such as the actuators HC-BP2B, HC-BP2C that adjust the length of the vertical part BP2 of the arm.

Referring to FIGS. 1 to 4 and in particular to FIGS. 9 to 10, it is detected that the first arm part BP1, which in the Figures is a horizontal arm part, is lengthwise adjustable with a linear movement by, for example, a telescopic structure BP1A, BP1B, BP1C, by means of which a reach of 1500 mm outside of the transportation unit is achieved. To adjust the reach of the first arm part BP1, the device comprises an actuator/transfer element such as the hydraulic cylinder HC-BP1B, HC-BP1C, so the actuator HC-BP1B shifts the middle part BP1B of the arm part BP1 in relation to the first, fixed (but rotatable) part BP1A, and the actuator HC-BP1C shifts the third, outermost part BP1C of the arm part BP1 in relation to the middle part BP1B.

Figure 1:
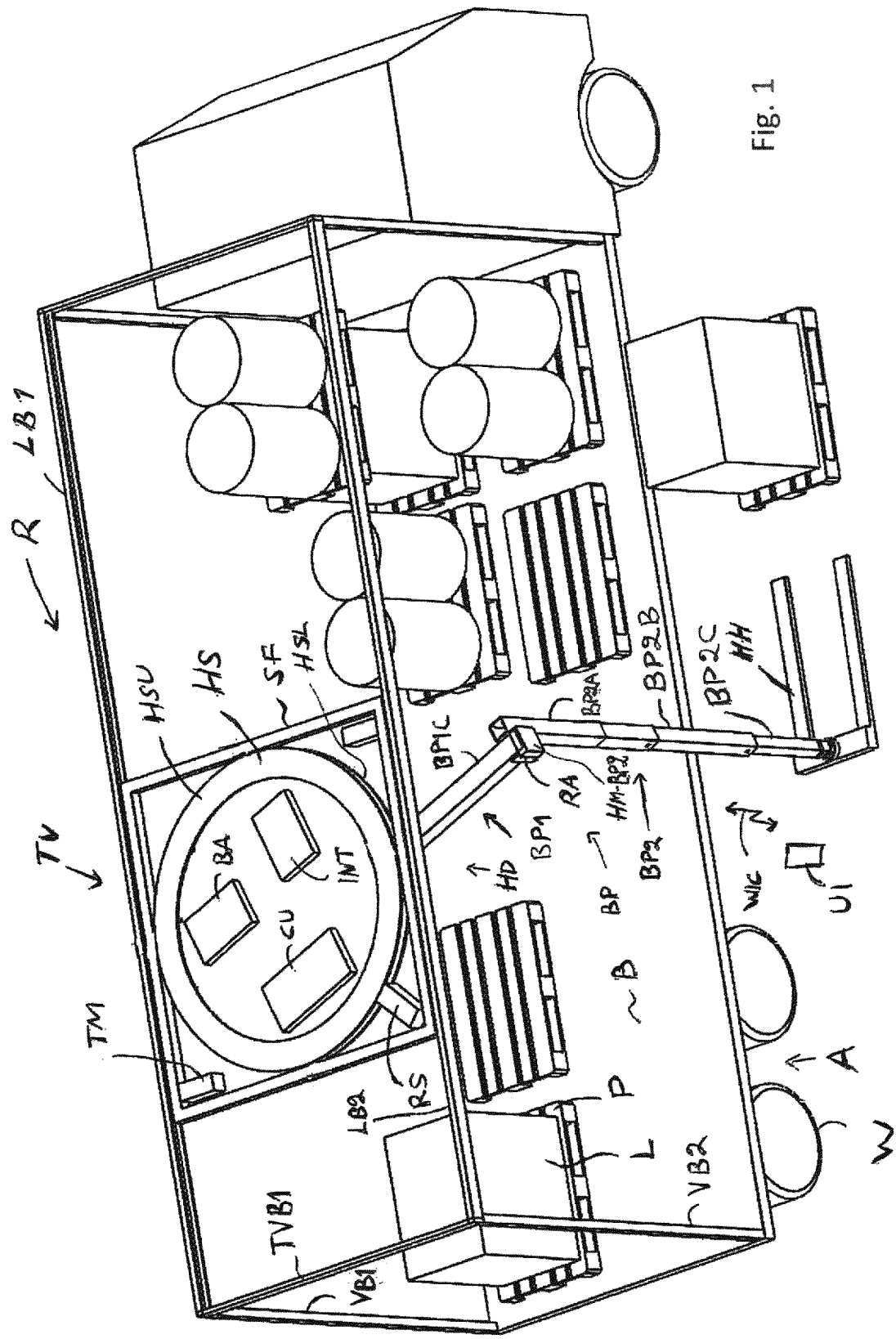
FIG. 1 shows the transportation unit obliquely from above.

Correspondingly, it is noted that the arm part, that is, the second arm part BP2 succeeding the rotating, folding fastening RA, which in the FIGS. 1 to 2 is a vertical arm part, is lengthwise adjustable with a linear, direct movement by, for example, a telescopic structure BP2A, BP2B, BP2C in which the reach of each telescopic arm part BP2A, BP2B, BP2C is 1500 mm, for example, so the total reach of the second arm part BP2A, BP2B, BP2C in the vertical direction, in particular, is 4500 mm, for example. In FIG. 3, this second arm part BP2 is folded/turned/tilted to be horizontal, so in practice turned under the roof R in the plane of the handling arm.

To adjust the reach of this second arm part BP2, the device comprises an actuator/transfer element such as the hydraulic cylinder HC-BP2B, HC-BP2C, so the actuator HC-BP2B shifts the middle part BP2B of the vertical arm part BP2 in relation to the first, fixed (but tiltable by the actuator part HC2) part BP2A, and the actuator HC-BP2C shifts the third, outermost part BP2C of the arm part BP2 in relation to the middle part BP2B.

In an embodiment, the handling head HH refers to so-called forklift forks, that is, a pair formed by adjacent two metal protrusions, which is disposed in the corresponding pockets of a pallet under the target of the handling, that is, load L. The handling head HH is rotatably fastened with the structure HHRA in relation to the end of the handling arm BP, so in practice to the outermost part BP2C of the handling arm part BP2. The handling head HH is folded, that is, rotated, that is, tilted by an actuator HHA, which may be a hydraulic rotating motor. The structure HHRA is a rotating fastening, such as a pin and a hole support, bearing, pivoting or a similar structure allowing the handling head HH to be tilted by the actuator HHA.

As important parts of the device, the device comprises a suspension structure HS to suspend said handling arm BP for the purpose of supporting it, and in addition a rotating structure RS to turn said handling arm BP by turning the suspension structure HS in relation to the support frame SF located at the upper part of the cargo space. Thus, the structure HS is a rotation ring structure disc for suspending the handling arm BP for the purpose of supporting it.

The handling arm BP is suspended under the rotatable rotation ring structure disc HS, that is, under the rotation ring structure/suspension structure HS, from the essentially horizontal first part BP1, BB1A of the handling arm.

This suspension structure HS of the handling arm BP is essentially rotationally symmetrical rotation ring structure HS, that is, a rotation ring structure HS rotated with said rotating structure RS in relation to its support frame SF. The rotation ring structure HS is in an embodiment a plate, that is, a disc, that is, circular. In a preferred embodiment, this suspension structure/rotation ring structure HS has a solid circumference, that is unbroken, whereby it may be rotated even more than 360 degrees into the same direction, so more than one full rotation. The rotation ring structure HS is a part of the frame of the handing device HD, that is, the lifting/transfer device, because the handling arm BP is suspended from it.

With reference to FIGS. 6 to 8, in particular, it is noted that the rotation ring structure type of suspension structure HS is rotatably supported to a rotation support surface RSS comprised by the support frame SF. In an embodiment, the suspension structure HS of the rotation ring structure type comprises an upper part HSU and a lower part HSL, and the rotation support surface RSS comprised by the support frame SF is between the upper part HSU and lower part HSL of the suspension structure HS of the rotation ring structure type. In such a case, this suspension structure HS of the rotation ring structure type will be supported and stabilized even if an object at the end of the protruding handling arm, such as the handling head HH of a boom, due to its weight aimed to lever the suspension structure HS out of its exact horizontal position in relation to its support frame SF.

In an embodiment, the upper part HSU and/or the lower part HSL of the suspension structure HS of the rotation ring structure type is/are supported to the rotation support surface RSS comprised by the support frame SF by a slide support. The Figures in particular focus on the resting of the upper part HSU of the suspension structure HS on the support surface RSS beneath it.

It is noted in the examples of the Figures, that of FIG. 8 in particular, that the suspension structure HS of the rotation ring structure type rests on the upper surface of the rotation support surface RSS by the lower surface HSUD of its upper part HSU, that is, on the structures GG1-GG4, in FIG. 8 when the support frame SF of FIG. 6 with its rotation support surface RSS is below the suspension structure HS of the rotation ring structure type show in FIG. 7, which is shown, for example, by the fact that the support surfaces GG1-GG4 comprised by the RSS in FIG. 8 are presented by dotted lines.

Relating to the suspension structure HS of the rotation ring structure type, it is the case in an embodiment that the suspension structure HS of the rotation ring structure type comprises a centering structure CS for the rotation, arranged to align the rotation of the suspension structure HS in relation to the support frame SF and/or in relation to the inner circumference RSSC of the rotation support surface RSS comprised by the support frame SF.

The centering structures CS and adjustment structures ADS possibly established with the same structural parts and to be referred to below are best seen in FIG. 11, that is, they are between the upper part HSU and lower part HSL of the suspension structure HS of the rotation ring type. The small circles HL forming the big circle in FIGS. 6 and 8 may be interpreted to be either these centering structures and/or adjustment structures, or alternatively openings used for installing/fastening them.

In an embodiment, the device comprises an adjustment structure ADS interconnecting the upper part HSU and lower part HSL of the suspension structure to adjust the distance between the upper part HSU and lower part HSL of the suspension structure. This way, the position of the rotatable suspension structure HS may be adjusted in relation to the rotation support surface RSS. The adjustment structure ADS is a bolt and nut type of structure, for example.

In an embodiment, the structure is multifunctional in that the rotation centering structure CS is in connection with the adjustment structure ADS either as an additional part or making use of the parts of the adjustment structure ADS, such as adjustment bolts that connect together the upper part HSU and lower part of the suspension structure HS. For the bolt circumference or similar connecting structure between the parts HSU, HSL of the suspension structure HS to rotate smoothly with the suspension structure HS in relation to the inner circumference RSSC of the rotation support surface RSS of the support frame SF, there may be bushings around the bolts or similar connecting parts, which get to rotate in relation to the bolts/connecting parts when the suspension structure HS is rotated in relation to the rotation support surface RSS.

FIGS. 7 to 8 show that the rotation support surface RSS is divided into four parts GG1-GG4 that also form the slide support for the lower surface of the upper part HSU of the suspension structure. A rotation support surface consisting of parts is better for possible maintenance.

FIGS. 6 and 8 indicate the toothing HSG that receives the rotational force of the motor RS, that is, the toothed circumference HSG is on the lower surface of a suspension structure HS of the rotation ring structure type, on its outer edge or in the vicinity of the outer edge, so the toothing HSG is on the same side, that is, the lower surface of the upper part HSU of the suspension structure as from where the suspension structure HS is supported to the rotation support surface RSS, GG1-GG4 in the support frame SF beneath it.

In an embodiment, the rotating structure RS is an electric motor RS, because it is simple to control and may easily be reversed into the opposite rotation direction. The electric motor or similar rotation structure RS is substantially parallel to the rotation ring structure HS in order to boost the use of space in the vertical direction of the cargo space.

In an embodiment, the support frame SF, in relation to which the suspension structure HS of the rotation ring type and consequently also the actual handling arm BP are arranged to be rotatable with the rotating structure RS, is substantially parallel to, that is, at the same height as the rotation ring structure HS. The rotating structure RS is in the area between the support frame SF and the rotation ring structure HS, preferably so that the support frame SF delimits the rotation ring structure HS within it. In this case, the module is compact and easy to install and/or remove, if needed, in relation to the edge beams LB1, LB2 of the roof of the transportation unit, on which edge beams the support frame SF with the structures within it rests. The gear RSG on the axle RSA of the rotating structure RS such as an electric motor turns, that is, rotates the rotation ring structure HS by the mating gears HSG on its circumference, as in FIGS. 6 to 7.

The support frame SF may be an essentially square circumference, assembled out of four profile pipes or by welding from an H beam, for example.

The width of the profile pipe or H beam may be 7 to 15 cm, for example, and the wall thickness 3 to 5 mm, for example.

As regards the support frame SF, it is noted that an option for a square circumference is a rectangle, that is, the length of the support frame SF differs from the width of the support frame, because in such a case the invention may be applied to transportation units having different lengths. For example, if the length of the support frame SF exceeds the width of the support frame by 200 mm, for example, then in a position turned by 90 degrees the support frame is suited for use in such a transportation unit where the distance between the frame beams in the longitudinal direction of the roof, so the width of the transportation unit, is correspondingly 200 mm wider.

For the handling device HD to be usable in a wider working area, the device comprises a transfer motor TM by means of which the support frame SF and the rotation ring structure HS supported to it, that is, the suspension structure HS and the handling arm BP suspended to it, are arranged to be transferrable by a linear movement in relation to guides GL1, GL2 in the longitudinal direction of the upper part edges of the transportation unit TU roof R, the guides being integrated into or fastened to the edge beams LB1, LB2 in the longitudinal direction of the roof R. The transfer motor TM is an electric motor, for example.

The device comprises a control unit CU, which is arranged to be supported by said suspension structure HS of the rotation ring structure type, in an embodiment on the suspension structure HS, that is, the rotation ring structure HS. The control unit CU may be implemented by a processor and/or programmable logic component. The user of the device, such as the vehicle driver, may have a user interface UI via a wireless connection WIC, by means of which he controls the control unit CU, transfer motor TM, rotating structure RS and other device structures, too, by means of which the handling arm BP is controlled.

It is noted that the device comprises a battery BA or another power supply unit BA, arranged to be supported by said suspension structure HS of the rotation ring structure type, in an embodiment on the suspension structure.

With reference to the battery BA, electric motors and/or control unit CU, in an embodiment they are 24-volt components/systems.

Further, the device may comprise an interface INT for power supply, the interface INT also being arranged to be supported by the suspension structure HS of the rotation ring structure type. The power supply interface may replace the battery, or it may be used to charge the battery from the electric system of the vehicle.

Next, the arm structure BP will be discussed, so the handling arm that has, as noted in the above, successive arms parts BP1, BP2 that may be tilted, that is, folded in relation to each other by an actuator, such as a hydraulic cylinder HC2 (FIGS. 9 to 10) or motor HM-BP2 (FIGS. 1, 2, and 4). In addition to the folding arm structure the handling arm BP comprises an arm structure the length of which may be adjusted in the direction of the handling arm. In practice in an embodiment, the arm parts BP1, BP2 themselves on the different sides of the rotating fastening RA, or at least one of them, may be lengthwise adjusted, in a telescopic manner. In the example of the Figures, both before and after the folding location of the handling arm, that is, the rotating fastening RA there is a linearly moving telescopic arm structure BP1, that is, BP1A, BP1B and BP2, that is, BP2A, BP2B, BP2C the length of which may be adjusted.

When examining the entire transportation unit instead of the handling device HD, the object is a transportation unit TU provided with a load handling device HD and, as noted in the above, is a trailer or a fixed or removable cargo space of a delivery vehicle, for example. Because the beams of the roof R edge belong to the transportation unit TU, it may be said that the width of the support frame SF supporting the rotation ring structure BP is, in the transverse direction of the transportation unit TU, substantially of the same magnitude as the distance between the longitudinal beams on the roof R edge of the transportation unit TU, in said embodiment the width of the support frame SF is only approximately 50 mm less than the distance between the edge beams of the roof R, in which case a clearance of 25 mm remains per side. The clearance allows the coupling between the gear TMG comprised by the transfer motor TM of the transportation unit TU in the longitudinal direction and the mating gears such as LB1G on the edge beam LB1 of the roof R, as in FIG. 5. The rotatable axle of the transfer motor TM is denoted by the marking TMA.

In the example of the Figures, the distance between the roof edge beams LB1, LB2 is 2200 to 2400 mm depending, for example, on whether the width of the beams LB1, LB2 is 100 mm or 200 mm, while the width of the transportation unit is 2600 mm, and in which case in accordance with the above, the transverse width of the support frame is 2150 mm or 2350 mm, so a mere 50 mm less, that is, substantially of the same category as the distance between the roof edge beams, having guides CL1, CL2 for the support frame SF, that is, 2200 mm or 2400 mm. FIG. 1 shows a second transfer motor TM2, too, which transfers the handling device HD in relation to the second beam LB2.

The lifting capacity of the handling device HD is 1000 to 1500 kg, depending on the design of the structures.

In an embodiment, the diameter of the circularly symmetric rotation ring structure HS is at least 75% of the distance between the longitudinal beams LB1, LB2 at the edge or the roof R of the transportation unit TU, in which case the support of the suspension structure HS, that is, the rotation ring structure is good and so the support of the handling arm BP is good, that is, stable.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. A device for load handling, the device comprising:
a folding handling arm, equipped with a handling head and at least two successive arm parts, in which the arm parts are connected to each other by a folding fastening
a suspension structure to suspend said handling arm for the purpose of supporting it,
a rotating structure to turn said handling arm by turning the suspension structure in relation to the support frame located at the upper part of the cargo space in the device, and
a transfer motor by means of which the support frame and the rotation ring structure supported to and the handling arm suspended from it are arranged to be transferrable by a linear movement in relation to guides in the longitudinal direction of the upper part edges of the transportation unit roof,
wherein the suspension structure of the handling arm is essentially a rotationally symmetrical, rotation ring structure disc that is rotatable in relation to its support frame with said rotating structure in order to suspend the handling arm for the purpose of supporting it,
wherein the two successive arm parts are both configured to be independently extended and collapsed so as to be stored underneath and against the suspension structure.

2. The device as claimed in claim 1, wherein the rotation structure is substantially parallel to the rotation ring structure in order to boost the use of space in the vertical direction of the cargo space.

3. The device as claimed in claim 1, wherein the support frame, in relation to which the suspension structure of the rotation ring structure type and consequently the handling arm are arranged to be rotatable with the rotating structure, is substantially parallel to the suspension structure of the rotation ring structure type.

4. The device as claimed in claim 3, wherein the rotating structure is in the area between the support frame and the rotation ring structure.

5. The device as claimed in claim 1, wherein the support frame delimits the rotation ring structure within it.

6. The device as claimed in claim 1, further comprising a control unit which is arranged to be supported by said suspension structure of the rotation ring structure type.

7. The device as claimed in claim 1, further comprising a battery or another power supply unit arranged to be supported by said suspension structure of the rotation ring structure type.

8. The device as claimed in claim 1, further comprising an interface for power supply, the interface being arranged to be supported by the suspension structure of the rotation ring structure type.

9. The device as claimed in claim 1, wherein in addition to the folding arm structure, the handling arm further comprises an arm structure the length of which is adjustable in the direction of the handling arm.

10. The device as claimed in claim 9, wherein one or more arm parts includes such an arm structure the length of which is adjustable.

11. The device as claimed in claim 1, wherein the suspension structure of the rotation ring structure type is rotatably supported to a rotation support surface comprised by the support frame.

12. The device as claimed in claim 11, wherein the suspension structure of the rotation ring structure type includes an upper part and a lower part, and the rotation support surface comprised by the support frame is between the upper part and lower part of the suspension structure of the rotation ring structure type.

13. The device as claimed in claim 12, further comprising an adjustment structure interconnecting the upper part and lower part of the suspension structure to adjust the distance between the upper part and lower part of the suspension structure.

14. The device as claimed in claim 1, wherein the upper part and/or the lower part of the suspension structure of the rotation ring structure type is/are supported to the rotation support surface comprised by the support frame by a slide support.

15. The device as claimed in claim 1, wherein the suspension structure of the rotation ring structure type includes a centering structure for the rotation, arranged to align the rotation of the suspension structure in relation to the support frame and/or in relation to the inner circumference of the rotation support surface comprised by the support frame.

16. The device as claimed in claim 1, wherein the handling arm is suspended under the rotatable rotation ring structure disc from the essentially horizontal first part of the handling arm.

17. A wheel-mounted load transportation unit of a vehicle, comprising a device for load handling including:
- a folding handling arm, equipped with a handling head and at least two successive arm parts, in which the arm parts are connected to each other by a folding fastening,
- a suspension structure to suspend said handling arm for the purpose of supporting it,
- a rotating structure to turn said handling arm by turning the suspension structure in relation to the support frame located at the upper part of the cargo space in the device, and
- a transfer motor by means of which the support frame and the rotation ring structure supported to and the handling arm suspended from it are arranged to be transferrable by a linear movement in relation to guides in the longitudinal direction of the upper part edges of the transportation unit roof, wherein essentially the suspension structure of the handling arm is essentially a rotationally symmetrical, rotation ring structure disc that is rotatable in relation to its support frame with said rotating structure in order to suspend the handling arm for the purpose of supporting it, wherein the two successive arm parts are both configured to be independently extended and collapsed so as to be stored underneath and against the suspension structure.

18. The transportation unit as claimed in claim 17, wherein the width of the support frame supporting the rotation ring structure is, in the transverse direction of the transportation unit substantially of the same magnitude as the distance between the longitudinal beams at the edge of the roof of the transportation unit.

19. The transportation unit as claimed in claim 17, wherein the diameter of the circularly symmetric rotation ring structure is at least 75% of the distance between the longitudinal beams at the edge or the roof of the transportation unit.

* * * * *